(12) United States Patent
Betancourt

(10) Patent No.: US 10,019,053 B2
(45) Date of Patent: Jul. 10, 2018

(54) VEHICLE TECHNOLOGY AND TELEMATICS PASSENGER CONTROL ENABLER

(71) Applicant: Toyota Motor Sales, U.S.A., Inc., Torrance, CA (US)

(72) Inventor: Moshe Stetson Betancourt, San Pedro, CA (US)

(73) Assignee: TOYOTA MOTOR SALES, U.S.A, INC., Plano, TX (US)

( * ) Notice: Subject to any disclaimer, the term of this patent is extended or adjusted under 35 U.S.C. 154(b) by 64 days.

(21) Appl. No.: 15/275,007

(22) Filed: Sep. 23, 2016

(65) Prior Publication Data

US 2018/0088661 A1  Mar. 29, 2018

(51) Int. Cl.
| | | |
|---|---|---|
| *G06F 3/02* | (2006.01) | |
| *G06F 3/01* | (2006.01) | |
| *G08G 1/0967* | (2006.01) | |
| *G01C 21/36* | (2006.01) | |
| *G06K 9/00* | (2006.01) | |

(Continued)

(52) U.S. Cl.
CPC .............. *G06F 3/011* (2013.01); *B60K 35/00* (2013.01); *B60W 50/12* (2013.01); *G01C 21/3667* (2013.01); *G01C 21/3694* (2013.01); *G06F 3/0219* (2013.01); *G06F 3/0227* (2013.01); *G06K 9/00838* (2013.01); *G06K 9/00845* (2013.01); *G08G 1/0967* (2013.01); *B60K 2350/1004* (2013.01); *B60W 2510/20* (2013.01); *B60W 2520/10* (2013.01); *B60W 2540/28* (2013.01); *B60W 2550/20* (2013.01); *B60W 2550/402* (2013.01)

(58) Field of Classification Search
CPC ...... G06F 3/011; G06F 3/0219; G06F 3/0227; G06K 9/00838; G06K 9/00845; B60K 35/00; B60W 50/12; G01C 21/3667; G01C 21/3694; G08G 1/0967
See application file for complete search history.

(56) References Cited

U.S. PATENT DOCUMENTS

| | | | |
|---|---|---|---|
| 6,731,925 B2 * | 5/2004 | Naboulsi | B60R 11/02 340/575 |
| 8,102,381 B2 | 1/2012 | Kimura | |
| 8,159,472 B2 | 4/2012 | Geaghan | |

(Continued)

FOREIGN PATENT DOCUMENTS

WO    WO2015/130970    9/2015

*Primary Examiner* — Joe H Cheng
(74) *Attorney, Agent, or Firm* — Snell & Wilmer LLP

(57) ABSTRACT

Methods, systems, and apparatus for enabling telematics in a vehicle. A telematics system for enabling telematics in a vehicle including multiple user interface elements that operate one or more telematics devices. The multiple user interface elements include a respective user interface element. The telematics system includes one or more sensors configured to provide driver control information and passenger presence information and an electronic control unit. The electronic control unit is connected to the one or more sensors. The electronic control unit is configured to obtain the passenger presence information and the driver control information. The electronic control unit is configured to enable the respective user interface element during operation of the vehicle based on the driver control information and the passenger presence information.

17 Claims, 6 Drawing Sheets

(51) Int. Cl.
  *B60K 35/00* (2006.01)
  *B60W 50/12* (2012.01)

(56) References Cited

U.S. PATENT DOCUMENTS

| | | | |
|---|---|---|---|
| 8,457,838 | B1 | 6/2013 | Fear et al. |
| 8,564,424 | B2 * | 10/2013 | Evarts .................. B60Q 9/00 340/426.24 |
| 8,700,318 | B2 | 4/2014 | Tan |
| 8,761,821 | B2 | 6/2014 | Tibbitts et al. |
| 8,768,286 | B2 | 7/2014 | Naboulsi |
| 8,781,568 | B2 | 7/2014 | Dugan et al. |
| 9,014,888 | B2 | 4/2015 | Sukkarié et al. |
| 9,201,932 | B2 | 12/2015 | Silver et al. |
| 2004/0093155 | A1 * | 5/2004 | Simonds ............. B60R 16/0231 701/532 |
| 2005/0116829 | A1 * | 6/2005 | Koenig ............... B60R 16/0231 340/576 |
| 2005/0280524 | A1 * | 12/2005 | Boone .................. B60K 35/00 340/461 |
| 2008/0186282 | A1 * | 8/2008 | Nix ...................... B60K 37/00 345/173 |
| 2008/0195261 | A1 * | 8/2008 | Breed ................. B60R 21/0132 701/2 |
| 2008/0245598 | A1 * | 10/2008 | Gratz ................. B60R 25/1004 180/287 |
| 2009/0055180 | A1 * | 2/2009 | Coon .................. B60R 16/0373 704/251 |
| 2009/0082951 | A1 | 3/2009 | Graessley |
| 2009/0259397 | A1 | 10/2009 | Stanton |
| 2010/0036560 | A1 * | 2/2010 | Wright .................. B60R 16/037 701/36 |
| 2010/0087987 | A1 * | 4/2010 | Huang .................. B60W 40/08 701/36 |
| 2010/0268460 | A1 * | 10/2010 | Wan .................... G01C 21/3415 701/414 |
| 2010/0297930 | A1 | 11/2010 | Harris |
| 2011/0137520 | A1 * | 6/2011 | Rector ............. H04M 1/72577 701/36 |
| 2011/0309926 | A1 * | 12/2011 | Eikelenberg ........ G01C 21/3469 340/439 |
| 2012/0053793 | A1 * | 3/2012 | Sala ...................... B60N 2/002 701/45 |
| 2012/0206252 | A1 * | 8/2012 | Sherony ................ B60W 30/12 340/438 |
| 2012/0253568 | A1 * | 10/2012 | Uyeki ................. B60L 11/1846 701/22 |
| 2013/0073114 | A1 * | 3/2013 | Nemat-Nasser ...... B60W 40/09 701/1 |
| 2013/0096731 | A1 * | 4/2013 | Tamari ................ G06F 11/3013 701/1 |
| 2017/0101111 | A1 * | 4/2017 | Fung .................... B60W 50/14 |
| 2017/0158023 | A1 * | 6/2017 | Stevanovic ........ B60H 1/00771 |
| 2017/0228126 | A1 * | 8/2017 | Kim .................... G02B 6/0055 |
| 2017/0282715 | A1 * | 10/2017 | Fung .................... B60K 35/00 |

* cited by examiner US 10,019,053 B2...

VEHICLE TECHNOLOGY AND TELEMATICS PASSENGER CONTROL ENABLER

BACKGROUND

1. Field

This specification relates to a system and a method for enabling telematics in a vehicle.

2. Description of the Related Art

Telematics refers to systems used for communication, instrumentation and control, and information technology in transportation. A vehicle's telematics system includes the integration of Global Position System (GPS) navigation, hand-free mobile devices, automatic driving assistance systems, wireless safety communications and other telecommunication or information systems. The various information technology devices present distractions to the driver while operating the vehicle so vehicle manufacturers prevent access or use of certain devices during operation of the vehicle to minimize the distractions.

By preventing access or use of certain devices and/or functions, other passengers are unable to use the devices and/or features during operation of the vehicle. Moreover, the vehicle manufacturers universally restrict access to features and/or devices during operation of the vehicle without consideration of the driver's level of distraction.

Accordingly, there is a need for a system and a method for enabling telematics during operation of a vehicle without compromising safety.

SUMMARY

In general, one aspect of the subject matter described in this specification is embodied in a telematics system for enabling telematics in a vehicle. The telematics system includes multiple user interface elements that operate one or more telematics devices. The multiple user interface elements include a respective user interface element. The telematics system includes one or more sensors configured to provide driver control information and passenger presence information and an electronic control unit. The electronic control unit is connected to the one or more sensors. The electronic control unit is configured to obtain the passenger presence information and the driver control information. The electronic control unit is configured to enable the respective user interface element during operation of the vehicle based on the driver control information and the passenger presence information.

These and other embodiments may optionally include one or more of the following features. The one or more sensors may include at least one of a load sensor that is located in proximity of a passenger seat of the vehicle, one or more hand position sensors located on a steering wheel or one or more cameras that recognize a passenger is in the vehicle. The driver control information may include an indication of a number of hands on the steering wheel. The passenger presence information may include a measure of a load on the passenger seat.

The electronic control unit may be configured to enable the respective user interface element based on the number of hands on the steering wheel and the measure of the load on the passenger seat. The electronic control unit may be configured to receive, from the one or more cameras, passenger presence information that indicates that the passenger is in the vehicle and receive, from the one or more hand position sensors, driver control information that indicates that two hands are on the steering wheel of the vehicle.

The one or more sensors may include at least one of a steering wheel alignment sensor that detects a steering angle of the steering wheel or a vehicle speed sensor that detects the vehicle speed of the vehicle. The driver control information may include the steering angle and the vehicle speed.

The respective user interface element may be configured to receive user input on a keypad that dials a mobile device and the electronic control unit may be configured to enable the respective user interface element to allow user input on the keypad.

The telematics system may include a memory configured to store one or more driver profiles and/or passenger profiles. Each driver profile of the one or more driver profiles may store a mode associated with a configuration setting for each user interface element of the multiple user interface elements. Similarly, a passenger profile may be stored and associated with configuration settings in a particular mode. The mode may be either an enabled mode or a disabled mode. The enabled mode may enable an associated user interface element and the disabled mode may disable the associated user interface element.

The electronic control unit may be configured to determine an identity of a driver of the vehicle. The electronic control unit may obtain, from the memory, a respective driver profile of the one or more driver profiles based on the identity of the driver. The electronic control unit may be configured to enable the respective user interface element during operation of the vehicle further based on the respective driver profile.

In another aspect, the subject matter is embodied in a method for enabling telematics in a vehicle. The method may include determining an identity of a driver of the vehicle and obtaining a driver profile based on the identity of the driver. The method may include disabling a respective user interface element of multiple user interface elements at a beginning of a current driving session based on the driver profile. The method may include determining that the vehicle is under control and enabling the respective user interface element in response to determining that the vehicle is under control.

In another aspect, the subject matter is embodied in a telematics system for enabling telematics in a vehicle. The telematics system may include a user displaying having one or more user interface elements. Each user interface element may correspond to a feature of the vehicle. The telematics system may include a navigation unit for providing navigational map information or traffic condition information. The telematics system may include an electronic control unit connected to at least one of the user display or the navigation unit. The electronic control unit may be configured to determine that a driver has control of the vehicle based on the driver control information. The electronic control unit may be configured to determine that a passenger is in the vehicle based on the passenger presence information. The electronic control unit may enable the respective user interface element when the driver has control of the vehicle and the passenger is in the vehicle based on at least one of the navigational map information or the traffic condition information.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for enabling and/or disabling telematics within a vehicle. Particular embodiments of the subject matter described in this specification may be implemented to realize one or more of the following advantages. A vehicle technology and telematics passenger control (VTTPC) enabler system ("telematics system") for enabling telematics within a vehicle provides user control over features of a vehicle. The telematics system balances the availability of features to occupants of the vehicle with the need to minimize distractions to the driver based on the driving situation. For example, if the driver is in full control of the vehicle and an adult passenger is in the passenger seat, the telematics system may allow full control of the user display unit since use of the user display by the passenger would not distract the driver during operation of the vehicle. However, if the driver is alone, the telematics system may disable some features, such as a user input field to type an address, while the vehicle is operating. This minimizes distractions to the driver.

Other benefits and advantages include the capability to customize availability of user interface elements based on an identity of the driver. For example, if an inexperienced teen driver operates the vehicle, the telematics system may have more stringent criteria before enabling any disabled user interface elements, whereas, if an experienced adult driver is operating the vehicle more user interface elements may be enabled to allow for additional access to features.

Additionally, the telematics system may take into consideration both internal and external environmental factors when determining whether to enable a feature of the vehicle. By taking into account both internal and external factors and customizing the criteria necessary to enable a particular feature and the feature that is enabled, the telematics system reduces driver distractions, encourages safe driving habits and allows availability of most features of a vehicle without compromising safety.

Figure 1:
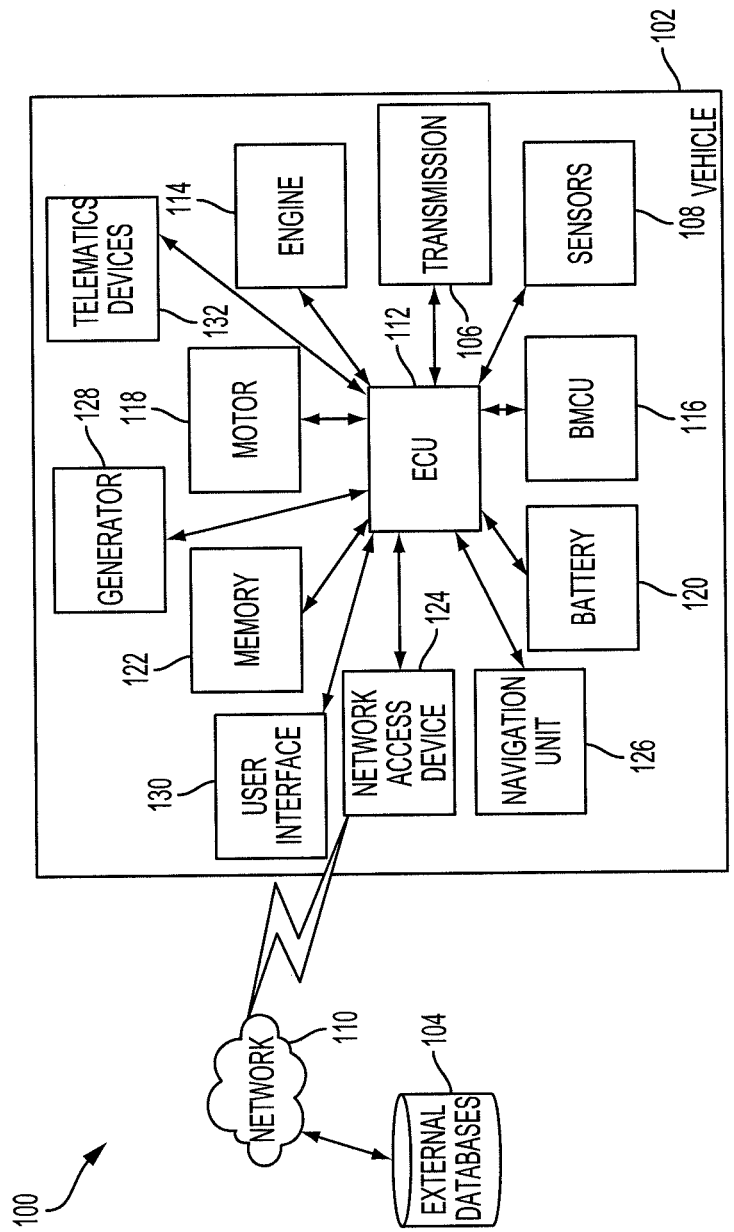
FIG. 1 is a block diagram of an example vehicle technology and telematics passenger control enabler system (VTTPC) for a vehicle according to an aspect of the invention.

FIG. 1 is a block diagram of an example vehicle technology and telematics passenger control (VTTPC) enabler system ("telematics system") for a vehicle 102. The telematics system 100 may include one or more computers or electronic control units (ECUs) 112, appropriately programmed, to enable telematics in the vehicle 102. The telematics system may include a navigation unit 126, a user interface 130, a memory 122, one or more sensors 108, a network access device 124, and/or one or more telematics devices 132 that perform telematics.

Vehicle telematics is the convergence of telecommunications and information processing within a vehicle, and encompasses telecommunications, road safety devices, wireless vehicle safety communications, navigation, and other information processing devices integrated with the vehicle 102. The one or more telematics devices 132 include entertainment centers, communication and/or navigation menus, e.g., menus to enter in a phone number, pair a mobile phone, or enter in an address, information menus, e.g., status menus, and/or control menus, e.g., temperature control menus.

The telematics system 100 may be included in a vehicle 102 and connected to one or more external databases 104 through a network 110. A vehicle 102 is a conveyance capable of transporting a person, an object, or a permanently or temporarily affixed apparatus. A vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes a motor 118 and/or a generator 128. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors 108 and/or navigation units 126 to drive autonomously.

The vehicle 102 may be coupled to a network 110. The network 110, such as a local area network (LAN), a wide area network (WAN), a cellular network, a digital short-range communication (DSRC), the Internet, or a combination thereof, connects the vehicle 102 and/or telematics system 100 to the one or more external databases 104. The external databases 104 may include databases from different service providers. A service provider may provide navigational map, weather and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 104 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include political, roadway and construction information. Political information includes political features such as cities, states, zoning ordinances, laws and regulations, and traffic signs or signals. For example, laws and regulations may include the regulated speed on different portions of a road or noise ordinances. Roadway information includes road features such as hills, curves, and straightaways. Construction information includes construction features such as construction zones and construction hazards.

Weather condition information includes one or more weather features, such as fog, a storm cell or other weather events. The weather condition information may provide a location of the weather event.

Traffic condition information includes one or more traffic condition features, such as traffic congested areas or accident areas. The traffic condition information may provide information related to the density and movement of vehicles on a roadway and/or accident locations.

Features, e.g., road features, political features, or traffic condition features, each have a location that may be identified by map coordinates. The map coordinates may be defined by latitude and longitudinal coordinates.

The vehicle 102 may include an engine 114, a motor 118, a generator 128, a battery 120 and a battery management and control unit (BMCU) 116. The motor 118 and/or the generator 128 may be an electric motor and an electric generator that converts electrical energy into mechanical power, such as torque, and converts mechanical power into electrical energy. The motor 118 and/or the generator 128 may be coupled to the battery 120. The motor 118 and/or the generator 128 may convert the energy from the battery 120 into mechanical power, and may provide energy back to the battery 120, for example, via regenerative braking. In some implementations, the vehicle 102 may include one or more additional power generation devices, such as the engine 114. The engine 114 combusts fuel to provide power instead of and/or in addition to the power supplied by the motor 118 and/or the generator 128.

The battery 120 may be coupled to the motor 118 and/or the generator 128 and may provide electrical energy to and receive electrical energy from the motor 118 and/or the generator 128. The battery 120 may include one or more rechargeable batteries.

The BMCU 116 may be coupled to the battery 120 and control and manage the charging and discharging of the battery 120. The BMCU 116, for example, may measure, using battery sensors (not shown), parameters used to determine the state of charge (SOC) of the battery 120.

The one or more ECUs 112 may be implemented as a single ECU or in multiple ECUs. The ECU 112 may be electrically coupled to some or all of the components of the vehicle 102 and/or the telematics system 100. The ECU 112 may be coupled to at least one of the navigation unit 126, the one or more sensors 108, the network access device 124 or the memory 122. The ECU 112 may include one or more processors or controllers specifically designed for automotive systems, and may include a VTTPC ECU, a telematics ECU, and/or a centralized ECU. The VTTPC ECU may be configured to determine the conditions to enable one or more disabled user interface elements to allow access to one or more user interface elements that control features of the telematics devices 132. The telematics ECU may disable user interface elements to prevent access to one or more telematics devices 132 during operation of the vehicle 102, and the centralized ECU may manage and control information, such as navigational map information and sensor information, between various components of the vehicle 102.

The ECU 112 may receive data from one or more components and control the operation of the one or more components based on the received or determined data. For example, the ECU 112 may receive data from the user interface 130, one or more sensors 108, and/or a network access device 124. The ECU 112 may control the operations of the BMCU 116 to charge or discharge the battery 120.

The memory 122 may be coupled to the ECU 112. The memory 122 may store instructions to execute on the ECU 112 and may include one or more of a RAM or other volatile or non-volatile memory. The memory 122 may be a non-transitory memory or a data storage device, such as a hard disk drive, a solid-state disk drive, a hybrid disk drive, or other appropriate data storage, and may further store machine-readable instructions, which may be loaded and executed by the ECU 112. The memory 122 may store an internal database that contains driver profiles and associations between driver profiles and configuration settings of one or more user interface elements that access telematics devices.

The network access device 124 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 110, to which the external databases 104 are also connected.

The one or more sensors 108 may be coupled to the ECU 112 and include a vehicle speed sensor, an acceleration input sensor, a steering angle sensor, a load sensor, one or more cameras, a proximity sensor, and/or a hand position sensor.

The vehicle speed sensor measures the speed of the vehicle, for example, by measuring the total revolutions of the wheel per minute. The steering angle sensor measures the rate at which the steering wheel angle changes. The proximity sensor detects surrounding vehicles and/or objects that are within a threshold distance of the vehicle 102. The proximity sensor may use radar to detect the objects and/or measure a distance to the objects. One or more cameras may be used to identify a driver, determine whether the driver's hands are on the wheel or a passenger is in the vehicle 102. The hand position sensor may be positioned on the steering wheel of the vehicle 102 and may detect that one or more hands are on the wheel, for example, by sensing pressure, reading a fingerprint or detecting a pulse rate. The load sensor may be positioned in proximity of a passenger seat to measure a load or weight on the passenger seat.

The navigation unit 126 may be coupled to the ECU 112 and provide vehicle information and/or navigation information to the ECU 112. The vehicle information may include the current location, direction and/or speed of the vehicle 102. The navigation information may include a route that the vehicle 102 is or will be travelling. The route may include a starting location, a destination location and/or a path between the starting location and the destination location.

Figure 2:
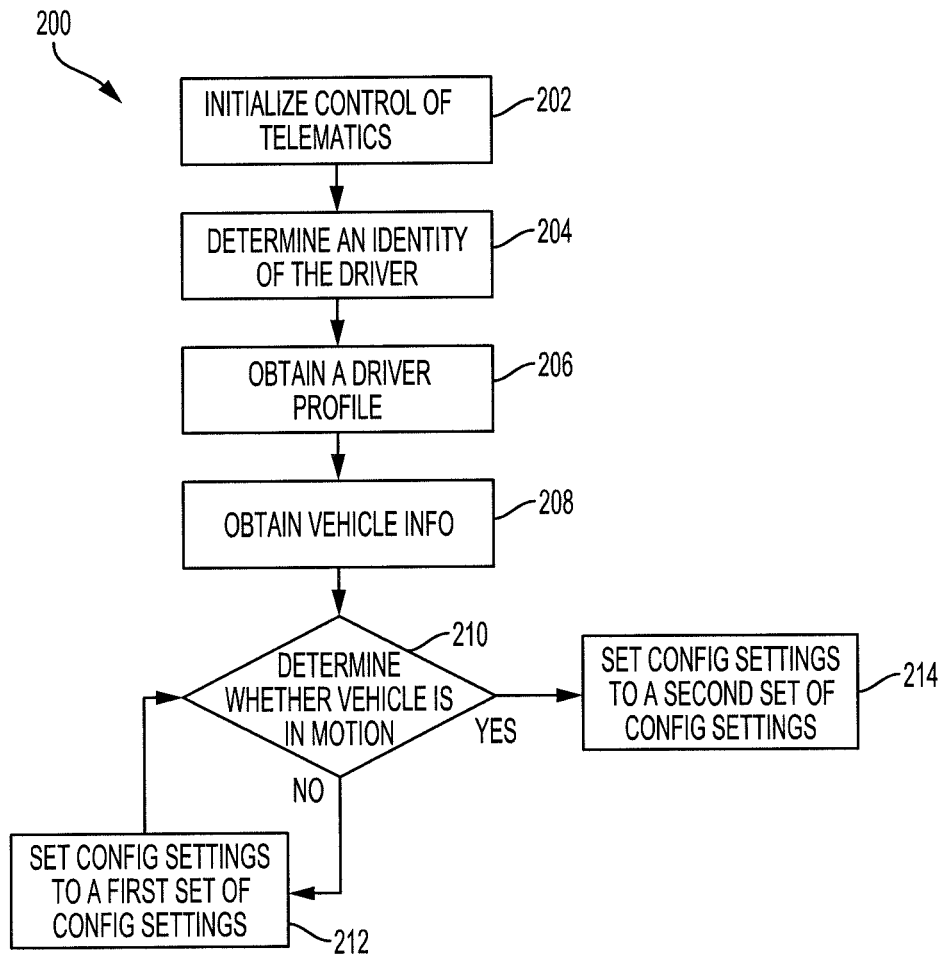
FIG. 2 is a flow diagram of an example process for enabling and/or disabling user interface elements that control telematics devices when a vehicle initializes according to an aspect of the invention.

FIG. 2 is a flow diagram of an example process for enabling and/or disabling user interface elements that control telematics devices when a vehicle 102 initializes. One or more computers or one or more data processing apparatuses, for example, the ECU 112 of the telematics system 100 of FIG. 1, appropriately programmed, may implement the process 200.

The telematics system 100 may initialize control of telematics devices 132 based on an indication the vehicle 102 is operational and/or user activation (202). The telematics system 100 may receive an indication from one or more sensors 108, such as an engine sensor, that indicates when the vehicle 102 is powered on. The telematics system 100 may initialize when the indication is received. The telematics system 100 may initialize based on user activation, for example, when a token, such as a key, is inserted to start the vehicle 102.

The telematics system 100 may determine an identity of a driver (204). The telematics system 100 may receive user input, such as a user identification token, a user id or a fingerprint, that identifies the driver, to determine the identity of the driver. For example, a driver's key fob may uniquely identify the driver when the driver opens the door or is within proximity of the vehicle 102. The telematics system 100 may obtain a user id from the driver, using the user interface 130, to identify the driver. The telematics system 100 may use other user interface elements, such as a memory button that configures the position of a mirror or a seat, other sensors, such as a camera that uses facial recognition, or a combination of devices and/or techniques to identify the driver of the vehicle 102.

The telematics system 100 may obtain a driver profile based on the identity of the driver (206). The telematics system 100 may associate the identity of the driver with a driver profile that may be stored in the memory 122. The driver profile may contain one or more configuration settings that are associated with one or more user interface elements that access features of the telematics devices 132, such as a scan/seek button on a radio or a user input field on the user interface 130 for typing in addresses. The one or more configuration settings are either in the enabled or the disabled mode.

Figure 5:
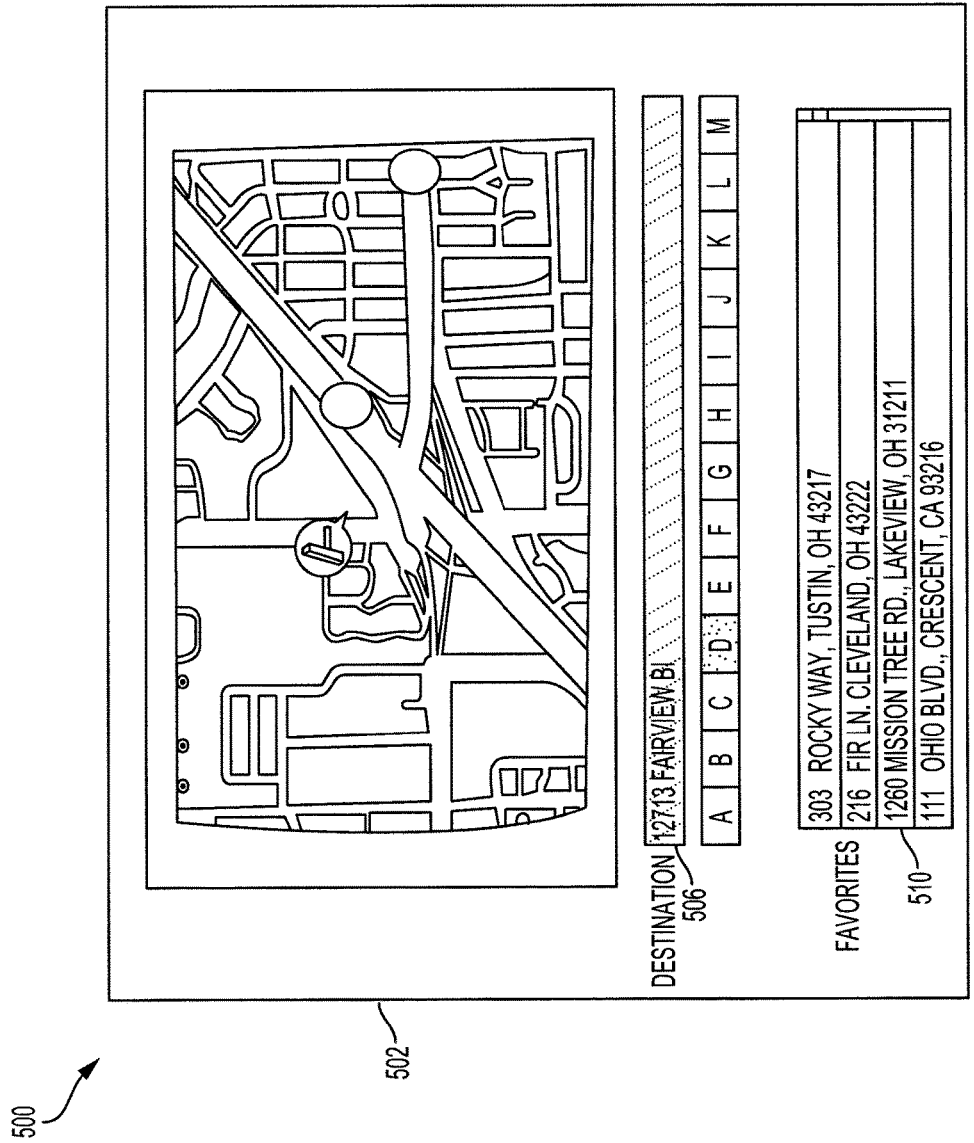
FIG. 5 is an illustration of a graphical user interface of a navigation map during operation of a vehicle according to an aspect of the invention.
Figure 6:
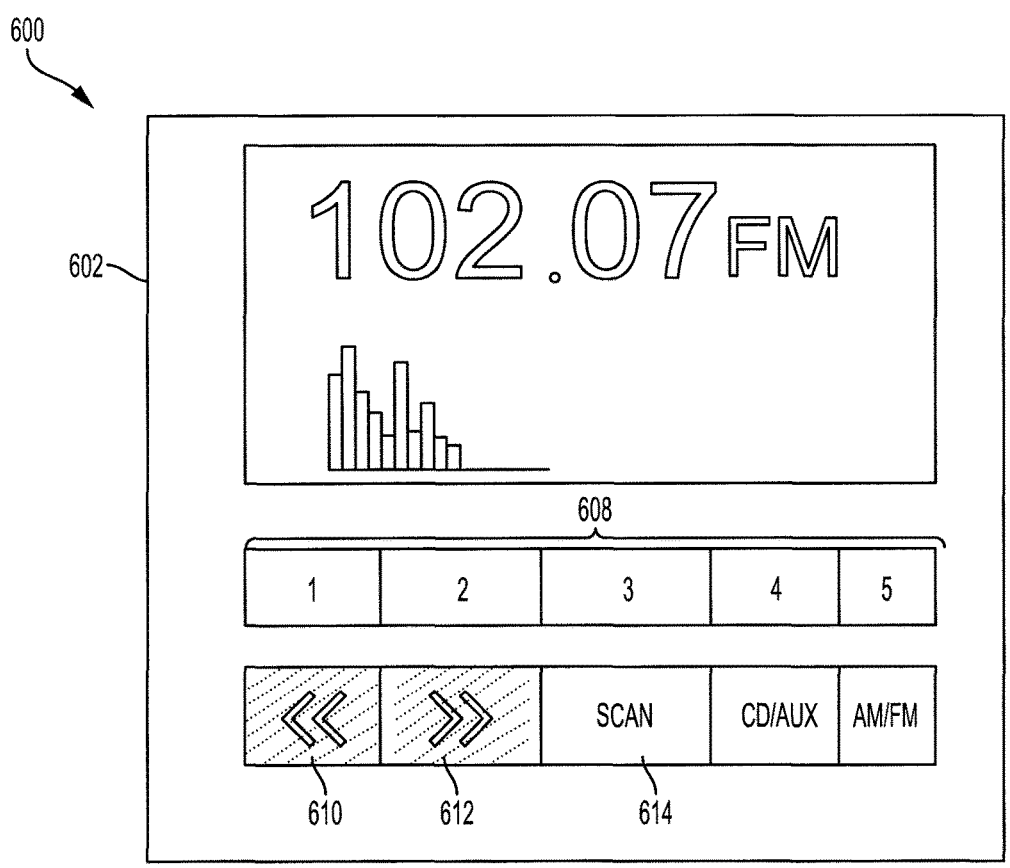
FIG. 6 is an illustration of a graphical user interface of a radio during operation of a vehicle according to an aspect of the invention.

When a configuration setting that corresponds to a user interface element is in the enabled mode, the telematics system 100 enables the user interface element and allows access to the feature of the respective telematics device 132 associated with the user interface element. When the configuration setting that corresponds to a user element is in the disabled mode, the telematics system 100 disables the user interface element and denies access features of the respective telematics device 132 associated with the user interface element. For example, as shown by the favorites address field 510 of the graphical user interface 500 of FIG. 5, the telematics system 100 allows a user select a favorite address from the favorites address field 510. However, if the configuration setting associated with the user interface element is in the disabled mode, the user interface element is disabled and the user is prevented from having access to the user interface element, for example, the user input field 506 is grayed out on the navigation map interface 502, as shown in FIG. 5. In another example, the seek buttons 610, 612 of the radio interface 602 may be disabled and grayed out but the radio pre-sets 608 and the scan button 614 may be enabled, as shown in FIG. 6.

The telematics system 100 may obtain vehicle information (208). The vehicle information may include the speed of the vehicle 102 and/or the location of the vehicle 102. The telematics system 100 may detect or determine the speed of the vehicle 102 using a vehicle speed sensor or the navigation unit 126. For example, the telematics system 100 may calculate the distance travelled over the course of a period of time using positioning and temporal information obtained from a global positioning system (GPS) device included in the navigation unit 126. The telematics system 100 may obtain a first location of the vehicle 102 at a first time and a second location at a second time to determine the speed.

The telematics system 100 may determine whether the vehicle 102 is in motion based on the vehicle information (210). If, for example, a vehicle speed sensor detects that the speed of the vehicle 102 is greater than or equal to a threshold value, e.g., 5 mph, the telematics system 100 may determine that the vehicle 102 is in motion. The telematics system 100 may calculate the speed of the vehicle 102 based on the first and second locations and the first and second times obtained from the navigation unit 126. In another example, if the location of the vehicle 102 changes over the course of a period of time, the telematics system 100 may determine that the vehicle 102 is in motion.

The telematics system 100 may set the one or more configuration settings to the enabled mode or the disabled mode which enables or disables a corresponding user interface element based on the operation of the vehicle 102 and/or driver profile. If the vehicle 102 is in operation but not in motion, the telematics system 100 may, by default, set the configuration settings to a first set of configuration settings (212). The configuration settings of the first set may be in the enabled mode by default so all of the one or more user interface elements may be enabled. In some implementations, even when the vehicle 102 is in operation but not in motion, the telematics system 100 sets the one or more configuration settings in the first set of configuration settings to the disabled mode so that one or more user interface elements are disabled. The setting of each of the configuration settings of the first set of configuration settings may be based on the driver profile.

If the telematics system 100 determines that the vehicle 102 is moving or after a threshold amount of time after the vehicle 102 is in motion, the telematics system 100 may set the one or more configuration settings to a second set of configuration settings (214) which may disable one or more user interface elements that were enabled. The second set of configuration settings may be a default or pre-determined set of configuration settings or may be based on the driver profile associated with the identity of the driver. One or more configuration settings of the second set may be in the disabled mode which disables one or more user interface elements associated with the one or more configuration settings. The disabled one or more user interface elements may, for example, correspond to the seek buttons 610, 612 and/or scan button 614 of the radio interface 602 of FIG. 6. One or more configuration settings of the second set of configuration settings that remain in the enabled mode may, for example, allow the pre-set favorites button 608 that corresponds to the pre-set radio favorites to remain enabled during operation of the vehicle 102. Other features of the telematics devices 132 that may be enabled and/or disabled include a valet mode that controls the unlocking or locking of the glove box and trunk or a lane assistance feature.

The second set of configuration settings may be different from the first set of configuration settings. That is, at least one configuration setting in the first set of configuration settings is enabled in the first set but disabled in the second set or disabled in the first set but enabled in the second set.

The one or more configuration settings in a set of configuration settings may be different for different drivers and/or passengers based on a driver profile and/or a passenger profile. For example, a particular configuration setting may be in the enabled mode for a particular driver when the vehicle is moving but in the disabled mode for another driver. A passenger profile may be obtained using one or more cameras or other forms of identification, such as user input through the user interface 130.

Figure 3:
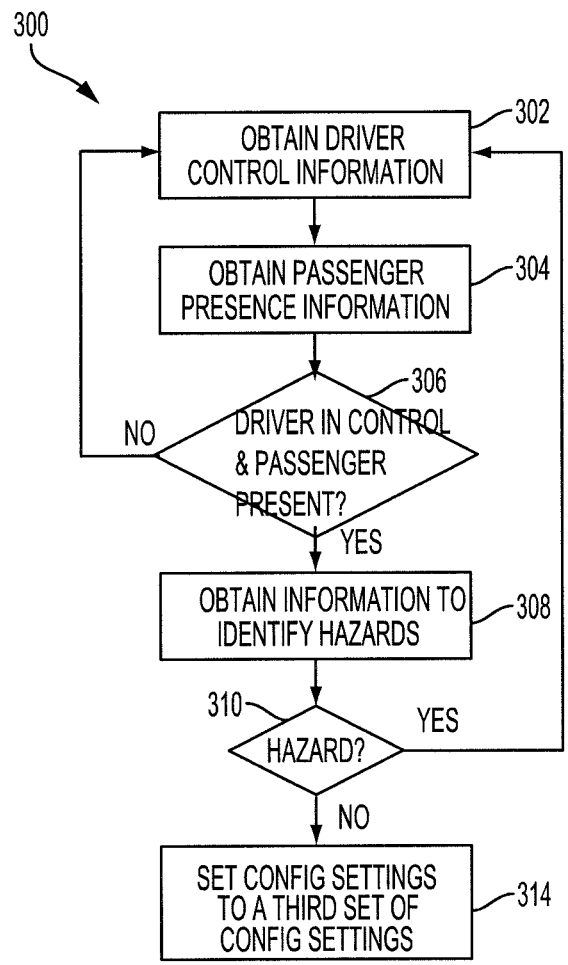
FIG. 3 is a flow diagram of an example process for enabling user interface elements while the vehicle is in motion according to an aspect of the invention.

FIG. 3 is a flow diagram of an example process for enabling user interface elements while the vehicle is in motion. One or more computers or one or more data processing apparatuses, for example, the ECU 112 of the telematics system 100 of FIG. 1, appropriately programmed, may implement the process 300.

The telematics system 100 obtains driver control information to determine whether a driver is in control of the vehicle 102 (302). Driver control information indicates a level of control that a driver has over the vehicle 102. The driver control information includes the speed of the vehicle 102, driver hand positions, and/or rate of change in the steering wheel angle.

The navigation unit 126 or the vehicle speed sensor may detect or determine the speed of the vehicle 102, as described above. A hand position sensor may indicate the number of hands on the steering wheel and/or the position of each of the hands. The telematics system 100 may use, for example, one or more hand position sensors that detect a heart pulse rate, a fingerprint or a palm print when a hand is gripping the hand position sensor to determine that a hand is gripping the steering wheel and/or the position of the hand. The one or more hand position sensors may be located at one or more predetermined positions on the steering wheel, e.g., between the eight thirty and the nine thirty positions and the two thirty and three thirty positions, that are sufficiently apart to require two hands on the steering wheel. The one or more hand position sensors may be at an optimal position, such as at the nine o'clock and three o'clock positions. A steering wheel angle sensor may detect an angle position of the steering wheel and/or the rate of change of the angle position of the steering wheel.

The telematics system 100 obtains passenger presence information (304). The passenger presence information indicates the presence or lack of presence of a passenger within the vehicle 102. The telematics system 100 may use one or more sensors 108, e.g., a load sensor, one or more cameras, or a seat belt sensor, to detect the presence of the passenger.

The load sensor may be positioned in proximity to or attached to a seat. The load sensor may measure a load or weight on the seat. The load sensor may send an indication of the load to the ECU 112 to determine if a passenger is situated on the seat. The one or more cameras may capture an image. The ECU 112 may analyze the image to determine whether a passenger is sitting in a seat and/or the identity of the passenger. A seat belt sensor connected to the seatbelt of each seat may detect whether a seatbelt has been fastened which may indicate that a passenger is situated in the seat.

The telematics system 100 determines whether the driver has control of the vehicle 102 and/or whether a passenger is situated within the vehicle 102 based on the driver control information and/or the passenger presence information, respectively (306).

The telematics system 100 determines whether the vehicle 102 is under control of the driver based on the driver control information. The driver control information includes the speed of the vehicle 102, the positioning of the hands on the steering wheel, or the angle of the steering wheel. If the speed of the vehicle 102 is below a threshold speed limit, two hands are positioned on the steering wheel and/or the rate of change of the steering wheel angle position is within a threshold deviation, the telematics system 100 may determine that the driver has control of the vehicle 102. In some implementations, the driver has to have control of the vehicle 102 for a period of time greater than a threshold amount. For example, the speed of the vehicle 102 has to be under a threshold speed limit for a period of two minutes to demonstrate the driver has control.

The threshold speed limit may be determined based on a speed limit for the current location of the vehicle 102. The current location of the vehicle 102 may be obtained from the navigation unit 126, and the speed limit may be extracted from the navigational map information that includes political features, such as speed limits. The threshold deviation of a rate of change of the angle position of the steering wheel may be determined from baseline steering angle data gathered from a previous driving session of the driver or that has been pre-programmed.

The telematics system 100 determines whether a passenger is in the vehicle 102 based on the passenger presence information. The passenger presence information may include at least one of an indication of a load on one or more seats of the vehicle 102, an indication of the number of seatbelts that are fastened within the vehicle 102, and/or an image of the interior of the vehicle 102.

The telematics system 100 may compare the load on the one or more seats of the vehicle 102 to one or more threshold weights to determine if there is a passenger in the seat. In some implementations, the load sensor may differentiate between an adult passenger and a child passenger based on the load. For example, if the load sensor detects a load greater than a first threshold value, e.g., 10 lbs., but less than a second threshold value, e.g., 75 lbs., the load sensor may indicate that a child passenger is situated on the seat. If the load is greater than the second threshold value, the load sensor may indicate that an adult passenger is situated in the seat. The telematics system 100 may adjust any enabled user interface elements based on the indication of a child or adult passenger.

The telematics system 100 may determine the number of seatbelts that are fastened using the seatbelt sensor. If the number of seatbelts fastened is greater than or equal to two, the telematics system 100 may determine that there is at least one passenger that is not the driver in the vehicle 102. The telematics system 100 may analyze an image taken by the one or more cameras within the vehicle 102 to determine if there is a passenger and/or the identity of the passenger. For example, the telematics system 100 may identify facial or body features that indicate a person is in the vehicle 102.

If the telematics system 100 determines that a passenger is in the vehicle 102 and that the driver is in control of the vehicle 102, the telematics system 100 may determine if there are one or more potential hazards in proximity to the vehicle 102. A potential hazard is an unavoidable risk or danger that may or may not be within proximity of the current location of the vehicle 102. An actual hazard is an unavoidable risk or danger that is within the proximity of the current location of the vehicle 102.

The telematics system 100 may obtain navigational map information, weather information, environment information and/or traffic condition information from the one or more external databases 104 or one or more sensors 108 (308). The telematics system 100 may determine the location of the one or more potential hazards from the obtained information.

For example, the telematics system 100 may extract a level of density of traffic for one or more locations and/or one or more accident locations from the traffic condition information. If the level of density of traffic at a particular location is greater than or equal to a threshold value or if there is an accident at the particular location, the telematics system 100 may associate the particular location with a potential hazard. In another example, construction information included in the navigational map information may identify a location of a construction feature, such as a construction zone, and the telematics system 100 may associate the location of the construction feature with a potential hazard. The telematics system 100 may identify other roadway features, such windy roads or inclined roads above a particular grade level, from the roadway information or weather features, such as storm cells, from the weather information as potential hazards. The type of features that are considered hazards may be configurable. The telematics system 100 may obtain environment information from one or more sensors 108, such as a proximity sensor, that detect objects around the vehicle 102.

The telematics system 100 may determine whether there is an actual hazard based on the location of the potential hazard and the current location of the vehicle 102 (310). The telematics system 100 may calculate a distance between the location of the potential hazard and the current location of the vehicle 102. If the calculated distance is less than or equal to a threshold value, the telematics system 100 determines that there is an actual hazard. The current location may be extracted from vehicle information obtained by the navigation unit 126. The telematics system 100 may extract the location of the potential hazard from the navigational map information, weather information, traffic condition information and/or the environment information.

If there is an actual hazard which is within proximity of the vehicle 102, the telematics system 100 may not set or change the one or more configuration settings to be in the enabled mode but rather keep the one or more configuration settings in the disabled mode. If there is no hazard, the telematics system 100 may set or change the one or more configuration settings to the third set of configurations which may enable additional user interface elements when the driver has control of the vehicle 102 and the passenger is present (314). The third set of configuration settings may set one or more configuration settings of the second set of configuration settings or the first set of configuration settings that were in the disabled mode to be in the enabled mode. The telematics system 100 may condition some, all or none of the one or more configuration settings of the third set of configuration settings to be in the enabled mode based on the driver profile.

In some implementations, the telematics system 100 sets the one or more configuration settings to a third set of configuration settings regardless if there are one or more actual hazards in proximity to the vehicle 102 so long as the driver has control of the vehicle 102 and the passenger is present.

In some implementations, the telematics system 100 does not automatically change the one or more configuration settings in the disabled mode to the enabled mode. Instead, the telematics system 100 allows for a user selection of a disabled user interface element which sets the corresponding setting to the enabled mode and enables the selected user interface element. For example, a user may select a user input field for an address that is grayed out which enables the user input field when the driver is under control of the vehicle 102 and the passenger is present in the vehicle 102. In some implementations, for example, when the speed of the vehicle 102 is greater than a maximum speed limit, no configurations are set to an enabled mode from the disabled mode even if other conditions that demonstrate driver control of the vehicle 102 and passenger presence are satisfied. In some implementations, different configuration settings may be set to the enabled mode from the disabled mode based on the identity of the passenger. The identity of the passenger may be determined using one or more cameras or sensors that identify the passenger.

The telematics system 100 may directly transition from the first set of configuration settings when the vehicle 102 is initialized to the third set of configuration settings when the vehicle 102 is under control and a passenger is present in the vehicle 102. If the driver has control of the vehicle 102 and the passenger is present prior to or within a threshold amount of time after movement of the vehicle 102, the telematics system 100 may transition the configuration settings directly from the first set to the third set of configuration settings.

Figure 4:
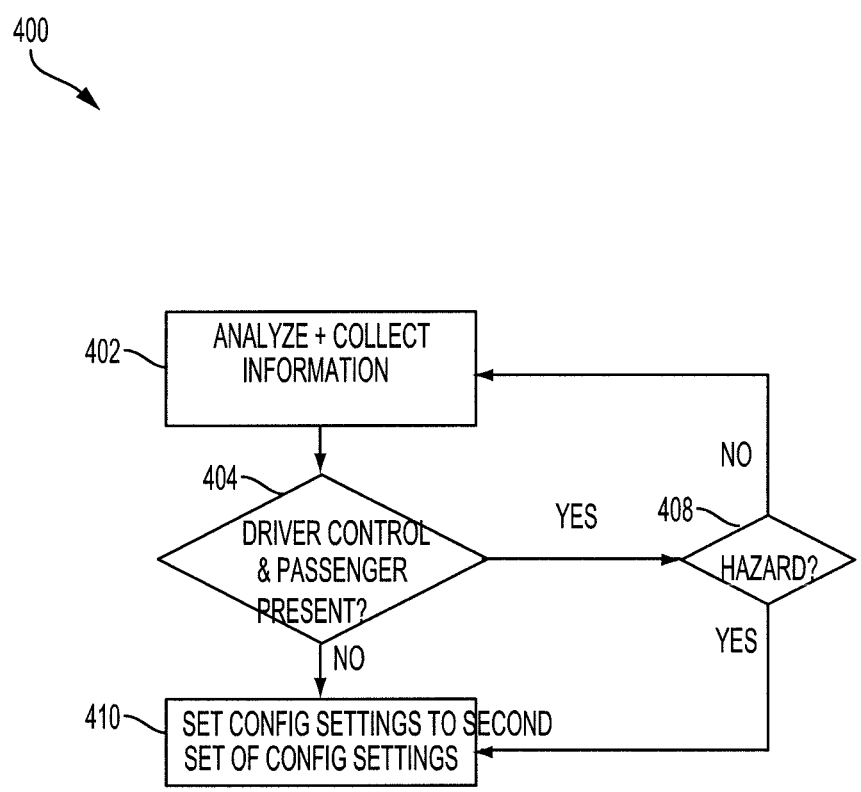
FIG. 4 is a flow diagram of an example process for resetting enabled user interface elements during operation of a vehicle according to an aspect of the invention.

FIG. 4 is a flow diagram of an example process for resetting enabled user interface elements during operation of the vehicle 102. One or more computers or one or more data processing apparatuses, for example, the ECU 112 or the navigation unit 126 of the telematics system 100 of FIG. 1, appropriately programmed, may implement the process 400.

The telematics system 100 may continue to monitor, collect and/or analyze the obtained information including the driver control information, the passenger presence information, the weather information, the environment information and/or the navigational map information (402). The telematics system 100 may collect and analyze the information periodically or in real-time.

The telematics system 100 may determine whether the vehicle 102 remains under control of the driver based on the analyzed and collected driver control information, and the telematics system 100 may determine whether a passenger is situated within the vehicle 102 based on the passenger presence information (404). If the driver no longer has control of the vehicle 102 or the passenger is no longer situated within the vehicle 102, the telematics system 100 may set the one or more configuration settings that were in the enabled mode into the disabled mode. If the driver maintains control of the vehicle 102 and the passenger remains situated within the vehicle 102, the telematics system 100 does not change the one or more configurations settings.

As the driver operates the vehicle 102, the telematics system 100 may continue to monitor, collect and/or analyze the environment information, the navigational map information, the vehicle information and the traffic condition information to determine any actual hazards within proximity of the vehicle 102. The telematics system 100 may detect and/or determine whether an actual hazard is within proximity of the vehicle 102 based on at least one of the environment information, the vehicle information, the traffic condition information or the navigational map information (408). If there is an actual hazard within proximity of the vehicle 102, the telematics system 100 may reset the one or more configuration settings to be in the disabled mode. If there is no actual hazard, the telematics system 100 does not change the one or more configurations settings.

The telematics system 100 may set the one or more configuration settings to the second set of configuration settings when there is an actual hazard, the driver has lost control of the vehicle 102, and/or the passenger is no longer present (410). In some implementations, the telematics system 100 only monitors the driver control information and passenger presence information and may reset the one or more user configuration settings based on only the driver control information and passenger presence information.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A telematics system for enabling telematics in a vehicle, comprising:
   a plurality of user interface elements that provide access to features of one or more telematics devices of the vehicle, the plurality of user interface elements including a respective user interface element that accesses a feature of a telematics device, the respective user interface element being in an enabled mode where the respective user interface element is accessible or a disabled mode where the respective user interface element is inaccessible;
   one or more sensors configured to provide passenger presence information including an indication of a number of seat belts that are fastened; and
   an electronic control unit connected to the one or more sensors and configured to:
      obtain, from the one or more sensors, the passenger presence information, and
      set a configuration setting for the respective user interface element to the enabled mode from the disabled mode during operation of the vehicle based on the indication of the number of seat belts that are fastened.

2. The telematics system of claim 1, wherein the one or more sensors further include at least one of a load sensor located in proximity of a passenger seat of the vehicle, one or more hand position sensors located on a steering wheel of the vehicle, or one or more cameras that recognize a passenger is in the vehicle, wherein the electronic control unit is configured to obtain, from the one or more sensors, driver control information.

3. The telematics system of claim 2, wherein the driver control information includes an indication of a number of hands on the steering wheel and the passenger presence information further includes a measure of a load on the passenger seat.

4. The telematics system of claim 3, wherein the electronic control unit is configured to set the configuration setting for the respective user interface element to the enabled mode from the disabled mode during operation of the vehicle further based on the number of hands on the steering wheel and the measure of the load on the passenger seat.

5. The telematics system of claim 2, wherein the driver control information includes a position of one or more hands on a steering wheel.

6. The telematics system of claim 2, wherein the one or more sensors further include at least one of a steering wheel alignment sensor that detects a steering wheel angle of the steering wheel of the vehicle or a vehicle speed sensor that detects a vehicle speed of the vehicle, wherein the driver control information includes the steering wheel angle and the vehicle speed.

7. The telematics system of claim 1, wherein the respective user interface element is configured to receive user input on a keypad that dials a mobile device.

8. The telematics system of claim 1, further comprising:
   a memory configured to store one or more driver profiles, wherein each driver profile of the one or more driver profiles stores a configuration setting for each user interface element of the plurality of user interface elements.

9. The telematics system of claim 8, wherein the electronic control unit is configured to:
   determine an identity of a driver of the vehicle;
   obtain, from the memory, a respective driver profile of the one or more driver profiles based on the identity of the driver; and
   set the configuration setting for the respective user interface element to the enabled mode from the disabled mode during operation of the vehicle further based on the respective driver profile.

10. A method for enabling telematics in a vehicle, comprising:
    determining an identity of a driver of the vehicle;
    obtaining a driver profile based on the identity of the driver;
    setting a configuration setting for a respective user interface element of a plurality of user interface elements to a disabled mode at a beginning of a current driving session based on the driver profile;
    obtaining passenger presence information including an indication of a number of seat belts that are fastened;
    determining that a passenger is present based on the indication of the number of seat belts that are fastened; and
    setting the configuration setting for the respective user interface element to the enabled mode from the disabled mode in response to determining that the passenger is present.

11. The method of claim 10, further comprising:
    determining that a driver has no control of the vehicle; and
    setting the configuration setting for the respective user interface element to the disabled mode in response to determining that the driver has no control of the vehicle.

12. The method of claim 11, wherein determining that the passenger is present is further based on a load on a passenger seat being greater than a threshold weight.

13. The method of claim 12, wherein the driver has no control of the vehicle when a speed of the vehicle is greater than a maximum speed limit.

14. The method of claim 10, further comprising:
    obtaining driver control information, wherein the driver control information includes at least one of steering angle data, speed data, or hand position data and the passenger presence information further includes passenger load data.

15. The method of claim 14, further comprising:
    determining that the vehicle is in control based on the driver control information.

16. A telematics system for enabling telematics in a vehicle, comprising:
    a user interface having one or more user interface elements, a respective user interface element of the one or more user interface elements corresponding to a feature of the vehicle and having a configuration setting in an enabled mode that enables the user interface element or in a disabled mode that disables the user interface element;
    one or more sensors configured to provide driver control information and passenger presence information including an indication of a number of seat belts that are fastened; and
    an electronic control unit connected to at least one of the user interface or the one or more sensors and configured to:
    determine that a driver has control of the vehicle based on the driver control information,
    determine that a passenger is in the vehicle based on the passenger presence information including the indication of the number of seat belts that are fastened, and set the configuration setting of the user interface element to the enabled mode from the disabled mode when the number of seat belts that are fastened is greater than or equal to two.

17. The telematics system of claim 16, wherein the driver control information indicates that two hands are on a steering wheel.

\* \* \* \* \*